April 28, 1970   A. W. PENNEY, JR., ET AL   3,508,445
MAGNETIC SUSPENSION ACCELEROMETER
Filed Aug. 7, 1967   4 Sheets-Sheet 2

FIG_6
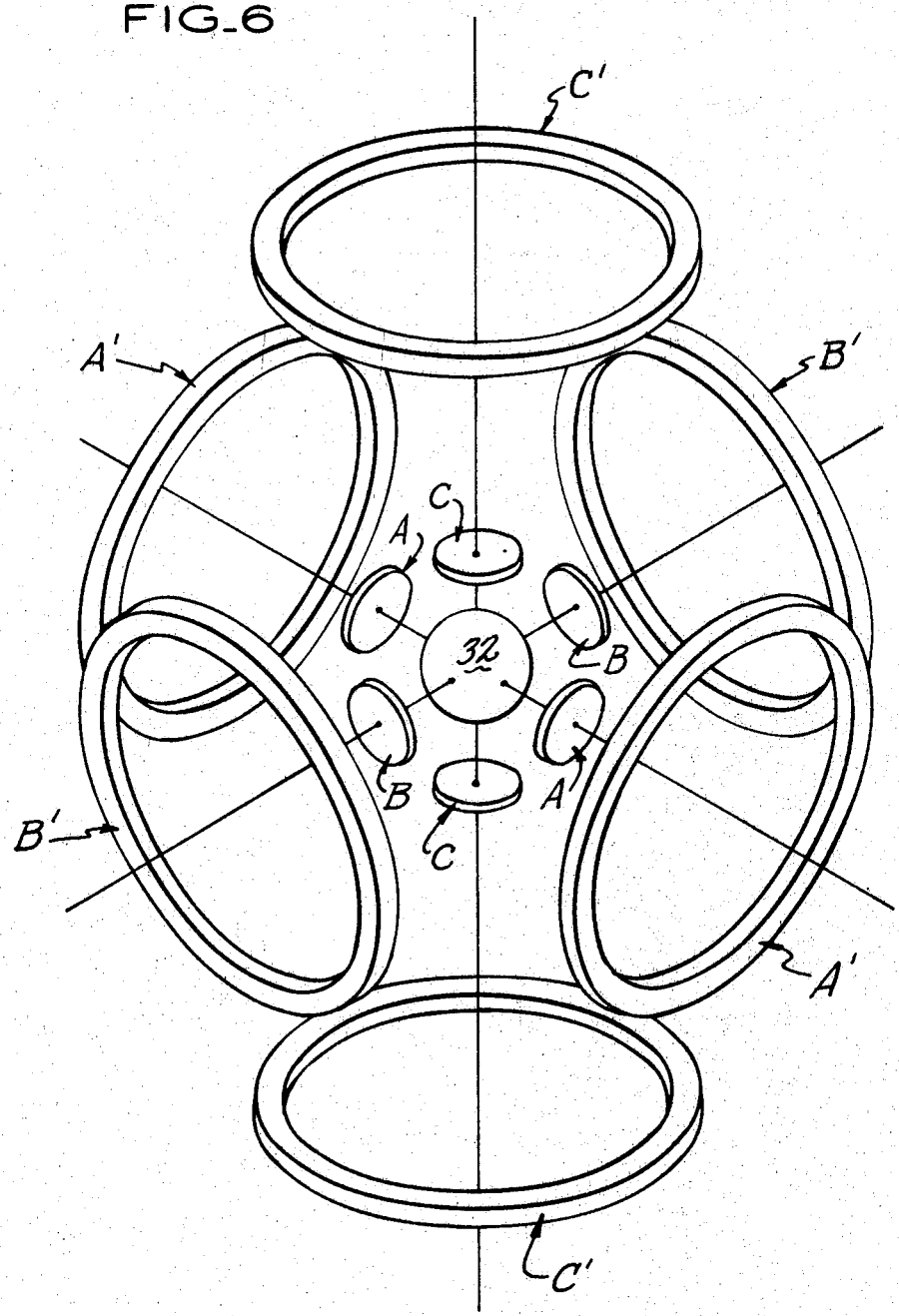

United States Patent Office 3,508,445
Patented Apr. 28, 1970

3,508,445
MAGNETIC SUSPENSION ACCELEROMETER
Albert W. Penney, Jr., Glastonbury, and Ernest P. Gagnon, East Hartford, Conn., assignors to United Aircraft Corporation, East Hartford, Conn., a corporation of Delaware
Filed Aug. 7, 1967, Ser. No. 661,163
Int. Cl. G01p 15/08
U.S. Cl. 73—517                    16 Claims

ABSTRACT OF THE DISCLOSURE

An AC magnetic suspension accelerometer consisting of AC excited coils to establish a time-varying magnetic field which confines an inertial mass to an equilibrium position, and a variable capacitance position sensing system to measure displacements of the inertial mass from its equilibrium position. Damping and heat transfer are accomplished by immersing the inertial mass in a fluid. By offsetting the mass from its equilibrium position, a differential accelerometer responsive to the earth's gravity is produced.

BACKGROUND OF THE INVENTION

Field of the invention

This invention relates to accelerometers, and particularly to a novel magnetic suspension accelerometer which precisely measures the magnitude and direction of acceleration over a wide dynamic range.

Description of the prior art

Present-day, commercially marketed accelerometers have acceleration thresholds on the order of $10^{-5}$ g. The novel accelerometer described herein allows the state-of-the-art to be extended by at least five orders of magnitude. The high sensitivity, precision and wide range of this accelerometer results directly from the utilization of a unique combination of new concepts. These concepts include the confinement of an inertial mass by means of magnetic fields, and an accurate determination of displacements of the mass by a high precision, capacitance technique. The novel accelerometer employs no rapidly rotating bodies, and therefore is not subject to the same set of limitations peculiar to gyroscopic accelerometers.

SUMMARY OF THE INVENTION

The basic principle which is employed in the novel accelerometer described herein is one which allows a determination of an acceleration from a measurement of the displacement of an inertial mass from a zero-point position. The displacements are detected by means of high sensitivity, incremental capacitance technique. The inertial body, in the form of a non-ferromagnetic, conducting metal sphere, is constrained in its motion along an axis by the force of interaction between an applied time varying magnetic field and eddy currents which are induced within the sphere by this magnetic field. The field distribution is chosen to support the sphere in stable equilibrium so that it makes no physical contact with the frame of the instrument. A viscous fluid is employed to give some degree of damping and to facilitate heat transfer from the sphere to the coolant system.

In another embodiment, three identical orthogonal pairs of coils and capacitive sensing systems are used to form a system capable of measuring all of the rectangular components of acceleration.

A further modification of the basic accelerometer shifts its operating range to permit measurement of accelerations including the value one G, thereby adapting its use to measurement of the earth's gravitational fields.

It is therefore an object of this invention to provide a novel magnetic suspension accelerometer having a wide dynamic range measuring accelerations from less than $10^{-12}$ G to more than $10^{-2}$ G.

Another object of this invention is a novel magnetic suspension accelerometer which utilizes eddy current support of an inertial mass about an equilibrium position by means of a time-varying magnetic field.

A further object of this invention is a novel magnetic suspension accelerometer which utilizes linearized differentially connected incremental capacitance bridges to sense displacement of a confined inertial mass.

Another object of this invention is a novel magnetic suspension accelerometer having a non-ferromagnetic electrically conducting material for its inertial mass.

Another object of this invention is a novel magnetic suspension accelerometer having a non-ferromagnetic electrically conducting material for its inertial mass.

A further object of this invention is a novel accelerometer in which an inertial mass is immersed in an electrically nonconducting fluid to provide mechanical damping and to facilitate heat transfer.

A more specific further object of this invention is a novel accelerometer in which the inertial mass is a solid or hollow sphere.

Another object of this invention is a novel accelerometer in which the displacement of an inertial mass is measured by sensing changes in capacitance between sets of fixed capacitor plates of small thickness, the capacitance sensors also being used as heat sinks for the thermal cooling of the accelerometer.

A still further object of this invention is a novel three-axis accelerometer capable of measuring all of the rectangular components of acceleration with a minimum of cross-axis coupling.

A further object of this invention is a differential magnetic suspension accelerometer for measuring the earth's gravitational field.

BRIEF DESCRIPTION OF THE DRAWINGS

These and other objects and a better understanding of the invention may be had by referring to the following description and claims, read in conjunction with the accompanying drawings in which:

FIGURE 1A shows the structure of the capacitive position sensors; FIGURE 6 shows schematically the arrangement of a three-axis accelerometer.

DESCRIPTION OF THE PREFERRED EMBODIMENT

The measurement of an acceleration is usually an indirect one, where the applied acceleration A is related by Newton's equation, viz. $F=MA$, to a force F acting on a known mass M. The resulting force F, in turn, is determined from a measurement of the displacement of the mass from some equilibrium position under the action of a restoring force mechanism.

Figure 3:
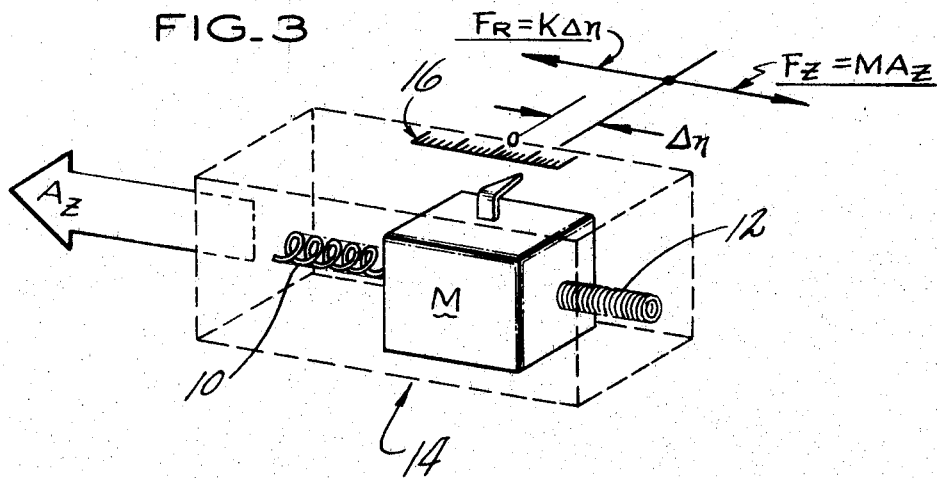
FIGURE 3 shows the principle of operation of accelerometers in general.

As illustrated in FIGURE 3, an inertial mass, M, is positioned and confined by a pair of opposing springs 10 and 12 along the z-axis of a supporting frame 14. In the absence of acceleration and gravitational forces, the mass M is situated at the equilibrium position or "zero point" with respect to a scale 16 fixed to the frame of the instrument. The net restoring forces applied by the springs 10 and 12 are zero at the zero-point position and increase in magnitude according to a known function of the displacement from the zero point. When an acceleration $A_z$ is applied to the supporting frame 14, the mass M, because of its inertia, experiences an inertial force $F_z$ which displaces the mass from its initial equilibrium position with respect to the frame. The new equilibrium position, that is, the point at which the inertial mass comes to rest, occurs where the net forces on the body are again zero. This new equilibrium position occurs at a point $\Delta \eta$, where the restoring forces of the springs $F_R = K \cdot \Delta \eta$, balances the inertial force of the mass, $F_z = MA_z$. At this point of stable equilibrium $F_z = F_R$, and therefore, no total net force acts on the inertial mass. The quantity K represents the effective spring constant, and the acceleration is determined from the relation $$A_z = \frac{K}{M} \cdot \Delta \eta$$

where the values of the quantities K, M and $\Delta \eta$ are known, being either constant or measurable. Therefore the determination of the applied acceleration, $A_z$, involves merely a measurement of a displacement $\Delta \eta$. The acceleration acting on the body, therefore, is uniquely determined by the magnitude of the restoring force at the new equilibrium position, and the mass of the body. Since the magnitude of the restoring force is uniquely determined by the displacement from the zero point, measurement of the displacement and mass are sufficient to determine the applied acceleration. This simplified description of an accelerometer must be modified to take into account the physical realities of friction, damping, variations of the restoring forces and geometric parameters of the system.

The basic accelerometer described above determines acceleration along a single axis only. Three identical, orthogonal devices would measure the components of acceleration along the three-principle axes of a rectangular coordinate system. Similarly, three mutually perpendicular restoring force fields similar to the springs described above which would operate on the same mass constitute a three-axis accelerometer. In this latter case, displacements would be measured along each of the three orthogonal axes.

The novel accelerometer disclosed herein consists of a non-ferromagnetic sphere of electrically conducting material as the movable mass which is confined to a region about the zero-point equilibrium position by means of magnetic fields. Linear displacement of the mass is measured by means of a variable spacing capacitance technique. Variations in the restoring force with displacement, namely the spring constant, are determined by the magnitude and distribution of the magnetic fields which are in turn defined by the shape and spacing of the field producing coils and the current which is passed through the coils.

Figure 1:
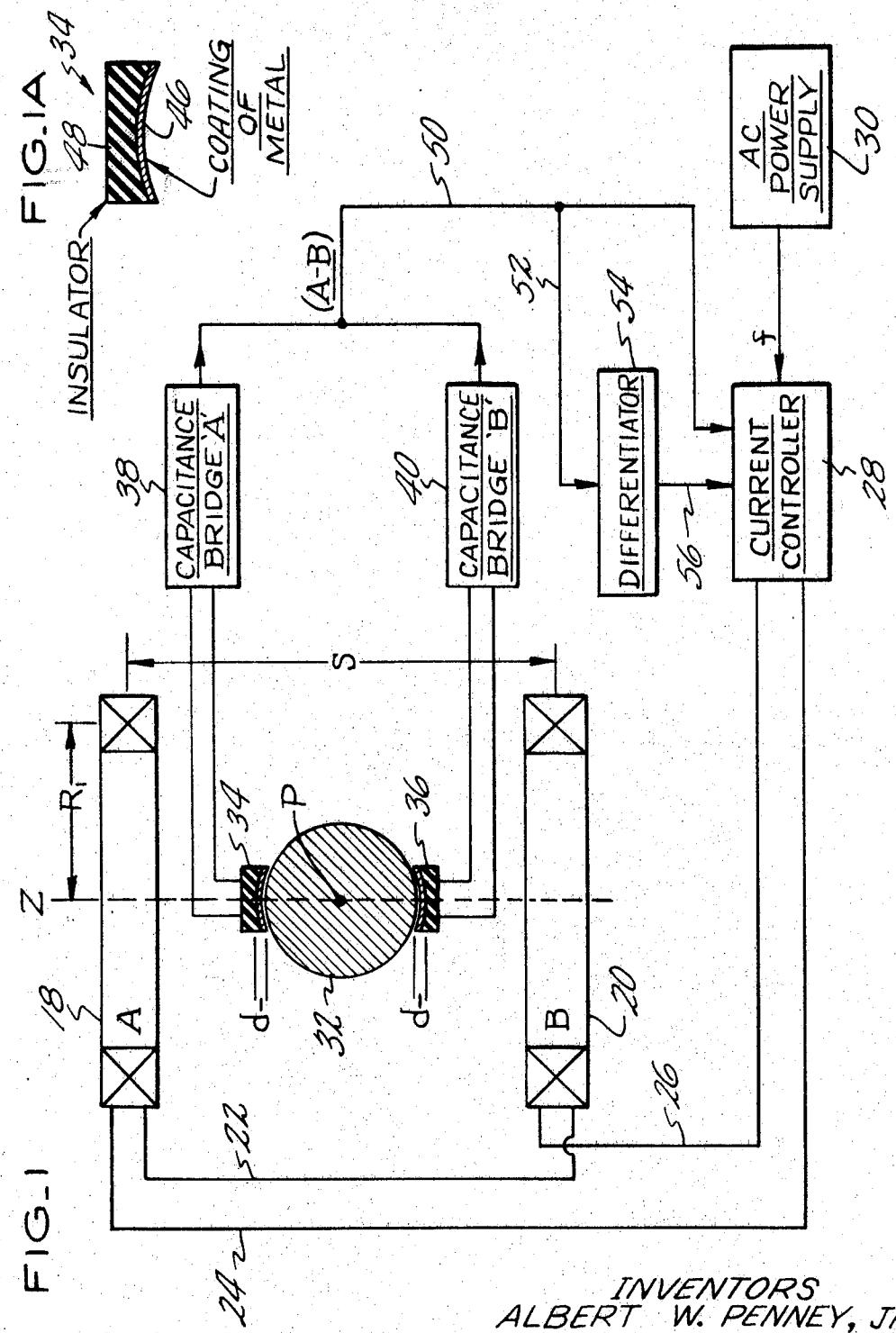
FIGURE 1 is a schematic diagram showing the operation of the magnetic suspension accelerometer and its position-sensing and current-control loops.

The confining forces for the alternating current magnetic suspension accelerometer are derived from the interaction of induced or eddy currents with the movable, inertial mass and the magnetic fields which produce these currents. Referring particularly to FIGURE 1, a pair of magnet coils A and B shown in cross section are located with their axes of symmetry coincident with the Z-axis. The coils are circular and have a mean radius $R_1$ and are separated from each other by a mean distance S. The coils A and B, shown as reference numerals 18 and 20, are connected through lines 22, 24 and 26 and through a current controller block 28, to be described subsequently, to a source of alternating current 30 having a frequency $f$. Electric currents from the power source establish time-varying magnetic fields about each coil. The coils are so connected that the magnetic fields are in opposition or 180° out of phase. As a consequence, the resulting combined magnetic field distribution exhibits large gradients in the region bounded by the two coils.

The inertial mass (M) 32 consists of a non-ferromagnetic conducting metal sphere such as silver, aluminum or copper. The spherical shape is chosen for complete symmetry in order to eliminate edge effects. The sphere may be either solid or hollow where in the latter the wall thickness must be greater than the skin depth of the magnetic field at the frequency $f$. Time-varying currents are established on the surface of the sphere by induction when the sphere is placed within the oscillating magnetic field of coils 18 and 20. The same magnetic fields interact with the currents induced within the sphere to produce forces on the sphere. If the magnetic field is homogeneous, or symmetric about the conductor, the forces are symmetric about the sphere and no net force is developed.

At the zero point indicated by P, which is located on the axis in the midplane of the coils, the net force on the sphere is zero due to the symmetry of the field about the zero point. Any displacement of the sphere along the Z axis produces a restoring force by the mechanism described above and the force acts toward the zero point P. In a region about the zero point the restoring force increases with increasing displacement and the rate of change of the force wtih displacement may be held constant by appropriate choice of the quantity $S/R_1$, that is, the ratio of the mean coil spacing S to the mean coil radius $R_1$. Values of $S/R_1$ in a range from 1.0 to 2.0 provide a linear force relationship for small displacements. The restoring force may therefore be described in terms of an effective spring constant K and the displacement from the zero point $\Delta \eta$. When an acceleration $A_z$ is established along the Z-axis, the sphere 32 of mass M experiences a displacement force $F = MA_z$. The new equilibrium position is located at a point on the Z-axis where the net force is zero. The equation $$A_z = \frac{K}{M} \cdot \Delta \eta$$

is satisfied. Since the ratio $K/M$ is known by design, the acceleration may be determined by measurement of the displacement $\Delta \eta$.

The particular coil pair arrangement 18 and 20 is the preferred embodiment. However, other configurations may satisfy the field requirement which include a time-varying magnetic field symmetric about a zero-point equilibrium position and increasing in magnitude in all directions from the equilibrium position.

A pair of position sensors 34 and 36 each consisting of a pair of capacitive plate elements are placed at a distance $d$ from the surface of the metal sphere 32. The metal plate/sphere system forms a capacitor in which the conducting sphere serves to "image" the two capacitive plate elements in each sensor so that they appear to face each other at a separation of $2d$. The electrical capacitance established between the metal sphere and the position sensors is inversely proportional to the spacing $d$, and therefore is sensitive to the position of the sphere relative to the sensing element. For motion of the sphere along an axis on which the sensing element is located, variations in the measured capacitance may be translated into corresponding variations in displacement from a zero-point position. The pair of capacitance plates 34 and 36, placed on the opposite sides of the sphere, form a complementary system.

Each of the capacitance plates is connected to a high precision, incremental capacitance measuring bridge 38 and 40 of standard manufacture. The bridges are differentially connected so that the imbalance in bridge voltage which appears in each of the two bridges when the sphere undergoes a displacement from its zero-point position is differenced to display only the net displacements of the floated body 32. Each bridge should operate at a different frequency to minimize interaction therebetween. This differential connection discriminates against unwanted effects. For example, symmetric thermal expansion of the sphere 32 reduces the spacing between each of the capacitor plates and the sphere by an identical amount and the capacitance difference will therefore remain zero. In the arrangement described, only net displacements of the sphere along an axis on which the capacitance detector is located are measured.

High precision, incremental capacitance measuring bridges known to the art measure only the capacitance between their input terminals and are insensitive to the capacitance between each of the input leads and ground. For this reason, the metal sphere must be electrically isolated from circuit ground which requires that the stray capacitance between the floated metal sphere and the grounded enclosure be minimized.

The minimum detectable displacement of the sphere 32 is proportional to the minimum measurable capacitance. In order to attain high sensitivity the spacing $d$ must be made small, and/or the surface area A of each capacitor plate must be made large. However, certain limits exist. Since the displacement of the sphere is measured along an axis on which the capacitor plates are located, small values of $d$ limit the maximum displacement that can be tolerated without allowing the sphere to come into contact with the plates. In addition, the restoring forces which are developed are a function of the effective spring constant and the displacement $d$. Therefore, large field gradients are required if the maximum allowable displacement is held to a small value. Spacings on the order of several thousandths to several hundredths of an inch offer a satisfactory compromise.

Figure 4A:
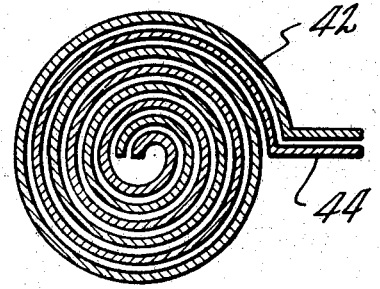
FIGURES 4A and 4B are detailed drawings of typical capacitor plate configurations.
Figure 4B:
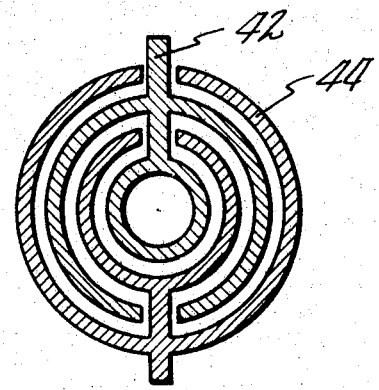

The area A is a function of the geometric configuration which the plates assume. FIGURES 4A and 4B illustrate two of the many possible plate configurations. Each capacitor plate element 42 and 44 may be graded in area so as to help linearize the relationship between the displacement and the measured capacitance.

For large surface areas, the capacitor plate elements must be spherically contoured to a radius whose center is coincident with the center of the sphere. These spherical segments assure uniform spacing between the capacitor plate elements and the sphere. The suggested shaping of the capacitor plate elements is shown in FIGURE 1A where the thin conducting plates 46 are supported by a rigid, nonconducting backing of insulating material 48 having an appropriate contour.

The greatest area which the position sensors 34 and 36 may assume is one half the area of the sphere 32. In this case, the position sensor becomes a hemisphere which is cupped about the sphere at a uniform separation, $d$. Each one of the pair of capacitor plates which comprise the position sensor may have an area A no greater than ¼ of the sphere area. In the three-axis configuration to be described subsequently, each sensing element may have a total surface area not exceeding ⅙ of the surface area of the sphere.

The thickness of the plates 46 must be less than the penetration depth of the magnetic field at the exciting frequency. The plating material should be a material of low conductivity to reduce distortion of the magnetic field. Plating material 46 must be a thin coating which may be chemically plated or photo etched onto the insulating backing 48. All material must be non-ferromagnetic.

The basic operating mode for the magnetic suspension accelerometer is one in which the current from the AC power supply 30 is maintained at a fixed value while the displacement of the floated sphere 32 as a function of applied acceleration is allowed to vary between the minimum and maximum values, a distance which is less than the distance $d$ of the position sensors 34 and 36. In this mode of operation the coils 18 and 20 are connected to the power supply 30 through a current controller 28 which, in this case, is simply a well-regulated, constant current supply. With this mode of operation, the combined differential output signal or error signal produced by comparing the output from capacitance bridges 38 and 40 may be sensed or monitored by a wide variety of instruments to maintain a continuous record of the instantaneous displacements and accelerations. Monitoring techniques may range from metering or strip chart methods to the more sophisticated and complex data processing equipment to provide a running account of data such as the velocity and instantaneous position in space of the accelerometer, this type of equipment constituting an inertial navigator.

The error signal may also be employed to self-regulate the accelerometer whereby the operating characteristics of the accelerometer are altered. The constant current mode of operation, while simple and straightforward, reduces the range of measurable acceleration which can be achieved by employing more sophisticated techniques.

A more desirable operating regime for the magnetic suspension accelerometer is one in which the "spring constant" is varied according to a prescribed function of the displacement or applied acceleration. This mode of operation extends the dynamic range of the instrument. Specifically, the differential output signal A–B from the pair of capacitance bridges 38 and 40 are used to control the exciting current for the magnet coils 18 and 20. The exact functional relationship between the displacement and the exciting current may be varied depending on the specific use of the accelerometer. However, for a given inertial mass M and range of acceleration, the two extremes of operation are: first, the smallest acceleration to be measured determines the minimum current which must be supplied to maintain the floated mass 32 at the minimum detectable displacement; and second, the greatest acceleration anticipated determines the maximum current required to confine the sphere to within the maximum allowable displacement.

Figure 5:
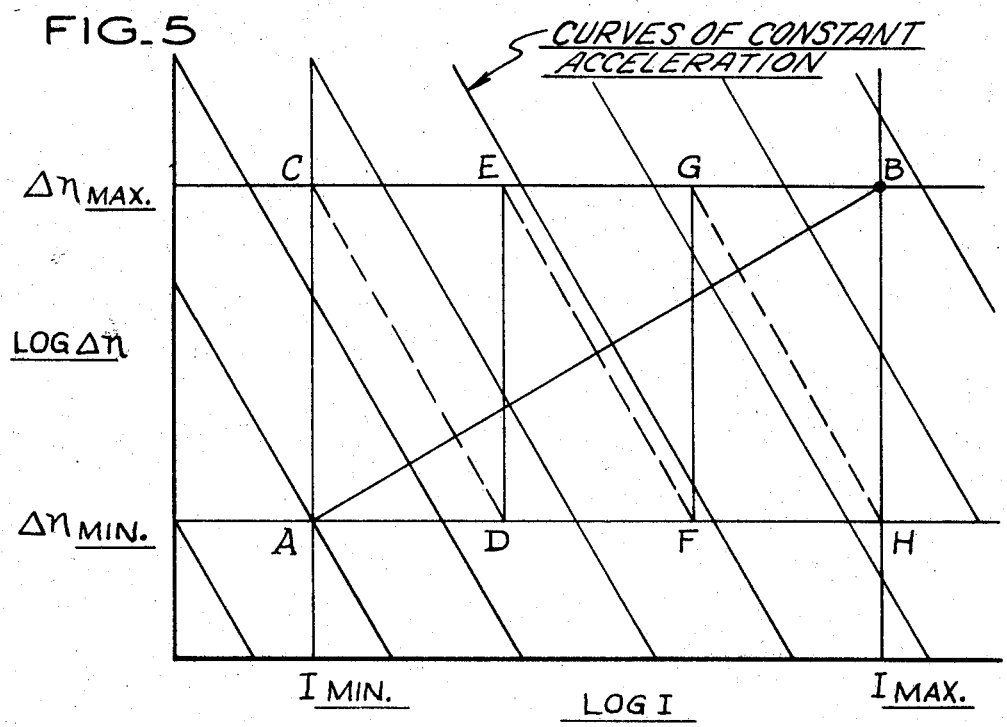
FIGURE 5 is a graph of the operating characteristics of the accelerometer of this invention.

FIGURE 5 shows graphically the operating characteristics of a typical magnetic suspension accelerometer. The displacement $\Delta\eta$ is plotted as a function of the exciting current, I, for curves of constant acceleration. Each axis is logarithmic. The extreme points of operation discussed above are labeled A and B, and several operating lines show the varying modes in which the accelerometer can be programmed to operate.

*Mode 1.*—This operating mode is characterized by a straight line joining the two limiting points A and B. The displacement is sensed by the two capacitance bridges 38 and 40, and the differential signal from the comparison of the outputs of the capacitance bridges is fed through line 50 (FIG. 1) to the current controller 28 where the current is varied according the proportionality $I \alpha (\Delta\eta)^\gamma$ where the exponent $\gamma$ is determined by end point conditions.

*Mode 2.*—This mode of operation is shown by lines AC, CD, DE, EF, FG, GH, and HB. In this case the exciting current is held constant over a range of accelerations while the displacement of the inertial mass varies between the limits of $\Delta\eta_{min}$ and $\Delta\eta_{max}$. At maximum displacement the current is adjusted to a second discrete value to bring the displacement back to the minimum displacement. This "discontinuous" change in operating conditions occurs along a line of constant acceleration. Conversely, when the displacement decreases due to a change in acceleration to a value of $\Delta\eta_{min}$, the current is altered to shift the displacement to $\Delta\eta_{max}$. The current is then held at a constant value while the displacement is allowed to vary between the two limits. Consequently, the operating characteristics describe a sawtooth pattern.

*Mode 3.*—For this mode of operation, shown by line AH and line HB, the displacement is maintained at a fixed value $\Delta\eta_{min}$, while the current is varied with changing acceleration. Any attempted variations in displacement of sphere 32 produces an error signal from the capacitance bridges which is used to reposition the mass 32 by altering the exciting current. For large accelerations the current approaches $I_{max}$. At that point the current control circuit 28 saturates and no further increase in current is allowed. Instead, the displacement increases to $\Delta\eta_{max}$ along the line HB completing the full range of operation. This is the preferred mode of operation, as it offers several distinct advantages over the other methods. Over a substantial portion of its range the mass 32 is not permitted to undergo any large displacements, and therefore problems associated with sudden changes in displacement, overshoot and large amplitude oscillations for sudden changes in acceleration can be minimized if the time constant for the electronic control circuits 28 is made short enough.

Other operating modes are possible and the specific choice of electronic current control circuits 28 for a specific mode will vary depending on the requirements. Such current control circuits are well known in the art. Nonlinear components, analog devices and wave shaping circuits may be combined to achieve desired complex operating characteristics.

The confining forces along the Z-axis of the alternating current magnetic suspension accelerometer are derived from the interaction of induced currents within the floated metal sphere 32 and the magnetic fields which produce these currents, as described herein before. These forces along the sensitive axis (Z-axis) of the instrument are accompanied to a lesser degree by forces in the plane which is orthogonal to the sensitive axis. These transverse forces give rise to an effective transverse spring constant and are due to an interaction of the time-varying magnetic field with the conducting metal sphere. The transverse spring constant is typically about one-third to one-fourth the value along the sensitive axis.

The existence of a transverse spring constant would constitute cross-axis coupling in a three-axis accelerometer to be described subsequently. This cross-axis coupling may be readily eliminated without impairing any of the essential features of the alternating current magnetic suspension accelerometer.

The transverse spring constant can be effectively removed by proper choice of the ratio of the electric currents in the field producing coils A and B. The exact value of this ratio depends on the ratio of the diameter of the field producing coils to their spacing. When this latter ratio is unity which gives the optimum configuration for a three-axis instrument, then the transverse spring constant is zero when one of the field producing coils carries about 5.8 times the AC current of the opposite coil. The coil carrying the greater current is the one toward which the inertial mass displaces under an applied acceleration along the z-axis. Confinement of the inertial mass along the z-axis for all values of applied acceleration is accomplished by varying the magnitude of the coil currents in accord with any of the operating modes described above while maintaining the appropriate current ratio. Current controller 28 establishes the proper coil current relationships by sensing the magnitude and sign (polarity) of the differential input signal, A-B. The larger the difference (A-B), the higher the AC coil current, of polarities corresponding to the sense of A-B. Such a current controller can be comprised of any of a number of well-known circuits.

The momentum acquired by the inertial mass in moving from one point of stable equilibrium to another causes the mass to oscillate about the final equilibrium position under the influence of the restoring force field. Immersion of the inertial mass in a viscous gas or fluid provides the required damping. The particular damping medium for a specific application is determined by the mass of the floated body and the effective spring constant since the mass must not be critically damped at any point in its operating range.

Figure 2:
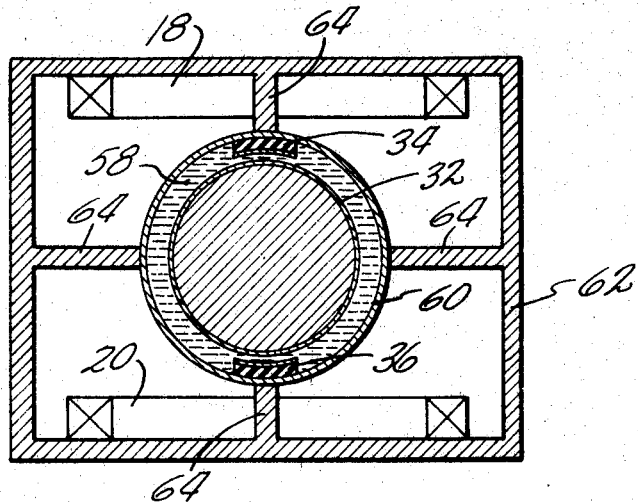
FIGURE 2 shows a typical embodiment of the magnetic suspension accelerometer.

FIGURE 2 shows a method of damping applicable to those modes of operation in which the current varies with acceleration. The differential output or error signal resulting from a comparison of the capacitive bridges 38 and 40 is fed through line 50 and line 52 through a differentiator circuit 54. The differentiated error signal is then fed to the current controller 28 through a line 56. Effective damping is therefore obtained by adding the first time derivative of the error signal from the capacitance bridges to the original signal for controlling the current. The addition of this differentiated signal provides a damping term in the equations of motion for the inertial mass, and the magnitude of this damping term can easily be varied electronically to suit the particular range of operation.

Even where electronic damping is used, viscous damping is desirable since not only is additional damping gained, but the fluid provides a path for heat conduction from the sphere to the walls of the enclosure. FIGURE 2 shows a typical embodiment of the magnetic suspension accelerometer. The metallic non-ferromagnetic sphere 32 is surrounded by a fluid 58 within a fluid container 60, the container having a nonconducting wall. The capacitive position sensors 34 and 36 are shown within the fluid 58 inside the wall 60. However, the position sensors 34 and 36 may be positioned outside the wall 60. The entire assembly is enclosed by means of a wall 62 which defines an outer enclosure. Coils 18 and 20 are positioned within the enclosure wall 62. A series of supporting members 64 extending from the walls 62 support the fluid container 60 within the center of the outer enclosure. While not shown, leads for electrical connections must be provided for the coils and the capacitive position sensors.

Heat is generated within the floated body by the ohmic losses of the induced eddy currents. The fluid 58 surrounding the sphere 32 may be selected to limit the temperature difference between the sphere 32 and the walls of the enclosure to a few degrees centigrade per watt of dissipated power for each centimeter of fluid conduction path. The capacitive position sensors 34 and 36 may be used as "heat sinks" for the generated thermal power because of their close proximity to the sphere 32 and their contact with the fluid 58.

The buoyant force exerted on the floated body 32 by the damping fluid 58 varies linearly with acceleration and this force acts along a line which is parallel to the net acceleration force. The effect of this force is to reduce the sensitivity of the instrument. In the measurement of acceleration the effect of the buoyant force can be completely removed from consideration by calibration because of its simple linear relationship to the acceleration.

The damping fluid 58 must not exhibit any ferromagnetic properties and must also have negligible conductivity. In addition, its dielectric constant must be relatively independent of temperature and applied voltage. Representative damping fluids include silicon oils of high purity which are available commercially in a wide range of density and viscosity.

FIGURE 6 shows a three-axis accelerometer in which three identical, orthogonal pairs of coils and capacitive sensors form a system capable of measuring all of the rectangular components of acceleration. The capacitive sensing elements are shown in pairs A, B and C with the corresponding coil pairs being A', B' and C'. If the frequency of the exciting currents is different for each coil pair, little interaction of the magnetic field of one pair of coils with the currents induced in the sphere by an orthogonal set will occur. The operating characteristics of the three-axis accelerometer along any single axis are identical for that of a single axis accelerometer and cross-axis coupling may be minimized by appropriate choice of current ratio, as described earlier. Mode 3 described previously in which the current is adjusted to hold the sphere at a fixed position is best suited for this type of operation.

In summary, the AC magnetic suspension accelerometer consists first, of a set of coils excited by an AC current which establishes a time-varying magnetic field having large gradients; second, a conducting body (inertial mass) which is situated within and confined by the influence of this time-varying magnetic field having established within it magnetic forces acting about an equilibrium position; and third, a position-sensing system employing a variable capacitance principle to measure displacements of the inertial mass from the point of stable equilibrium. The measured displacements may be translated into an equivalent acceleration. A feedback loop in which the current in the field-producing coils is varied according to a prescribed function of the applied acceleration or the displacement is also provided, thereby extending the dynamic range of this instrument to beyond those of the prior art. Damping and effective heat transfer is accomplished by immersing the body in an appropriate fluid. The accelerometer may be operated as a single or multiple axis instrument.

The magnetic suspension accelerometer previously described provides absolute measurement of the applied acceleration over a wide dynamic range. A typical accelerometer of this design may have an operating range from $10^{-12}$ g to $10^{-2}$ g, or under. For application within the gravitational field of the earth, it is necessary to extend or shift the operating range to include the value of 1 g. A differential accelerometer, i.e. one which detects and measures the deviation of the acceleration about some constant value, may be employed to measure and map variations in the earth's gravitational field.

Figure 7:
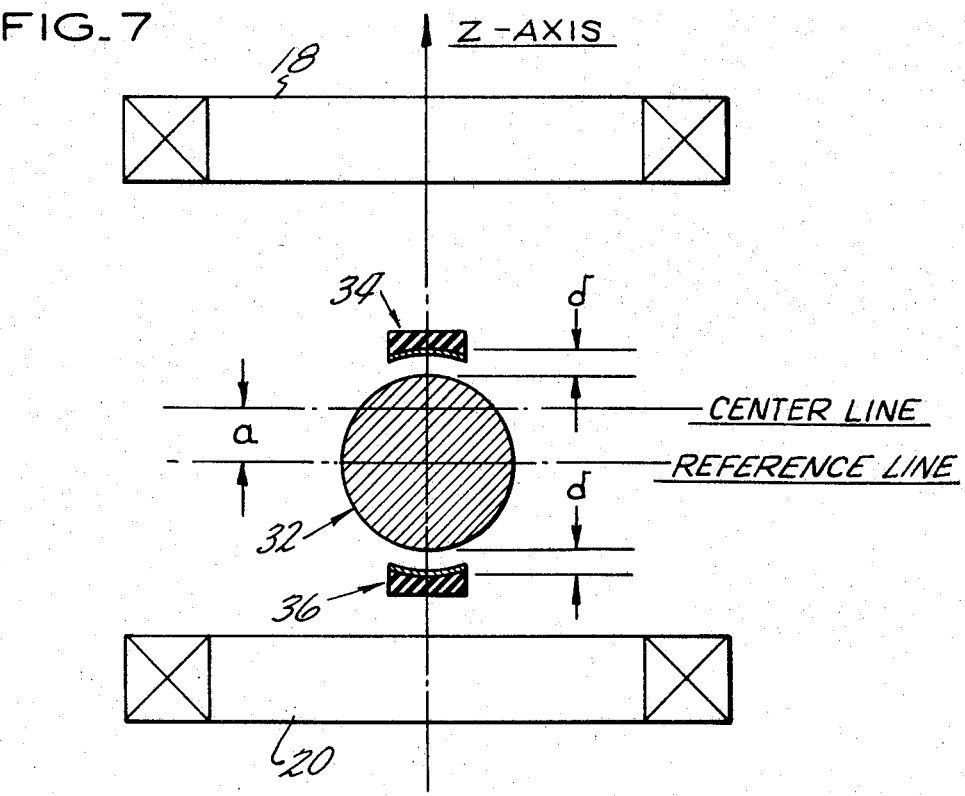
FIGURE 7 is a schematic diagram showing the accelerometer of an embodiment of the invention operating as a differential accelerometer.

FIGURE 7 shows schematically how the magnetic suspension accelerometer may be modified to operate in a differential mode. The differential accelerometer retains the principal features of the linear accelerometer described earlier. As in the linear device, the differential accelerometer consists of a coaxial pair of field-producing coils 18 and 20, a conducting metal sphere 32, and a pair of capacitive position sensing elements 34 and 36. In the linear accelerometer position sensing elements 34 and 36 are located symmetrically about the centerline between the two coils. For the differential instrument the sensors are repositioned to be symmetric about a new reference line located at a distance α from the centerline of the field-producing coils. The quantity α represents the location of the sphere at a point of stable equilibrium when the instrument is subject to a steady, applied acceleration in the z direction which, for example, may be the effective acceleration due to gravitational field of the earth, namely 1 g. By this method the position sensors 34 and 36 give a null or zero reading as long as the applied acceleration is maintained at its steady value. If, however, deviations in the applied acceleration occur then the sphere displaces to a new point of stable equilibrium and the position sensors give an indication of the displacement. Hence, only the differential changes in the applied acceleration are indicated.

As described previously, the inertial mass 32 of the linear accelerometer is immersed in a fluid for reasons of mechanical damping and efficient heat transfer. In addition, for high sensitivity to small accelerations the linear instrument contains a fluid whose density is much less than the density of the sphere in order to reduce or eliminate the buoyant force. On the other hand, for a differential accelerometer to operate in a 1 g field, a buoyant force is necessary. Therefore, the sphere in a differential accelerometer is immersed in a fluid of nearly equivalent density to the sphere. Here, also, the fluid provides damping and heat transfer.

In summarizing, the characteristics of the differential accelerometer are, first, its position-sensing elements are located symmetrically about a reference line which is determined by the location of the inertial body when the instrument is subject to an average or undeviated value of the applied acceleration; and second, the fluid density is only slightly less than the density of the sphere.

Although this invention has been described in its preferred embodiment, it is obvious that numerous modifications may be made to the construction and arrangement of parts without departing from the scope of the invention, which is to be limited and defined only as set forth in the following claims.

Having thus described a preferred embodiment of our invention, what we claim as new and desire to secure by Letters Patent of the United States is:

1. An accelerometer comprising an enclosure,
   a nonferromagnetic electrically conducting mass, support means for maintaining said mass suspended within said enclosure, said support means including a pair of coils arranged coaxially along an axis intersecting the center of said mass,
   a source of alternating voltage connected to energize said coils whereby a time varying magnetic field is established about each said coil, the field produced by one said coil being 180° out of phase with the field produced by the other said coil whereby time varying induced eddy currents are established on the surface of said mass which interact with said magnetic fields to thereby constrain said mass to an equilibrium position,
   and capacitor means positioned within said enclosure adjacent said mass for sensing changes in the displacement of said mass from said equilibrium position along the axis containing said coils and producing an output signal indicative of the magnitude and direction of said displacement.

2. Apparatus as in claim 1 in which said capacitor means comprises a pair of capacitor plate elements fixed within said enclosure along the axis containing said coils, one of said elements being positioned on either side of said mass and producing a capacitance signal inversely proportional to the distance between said one element and said mass.

3. Apparatus as in claim 2 in which said capacitor plate elements consist of thin conducting coating mounted upon a substantially rigid nonconducting backing contoured to a radius having a center coincident with the center of said mass, said elements being disposed closely adjacent said mass.

4. Apparatus as in claim 2 and including first and second capacitance bridges,
   means transmitting the capacitance signal from each of said capacitor plate elements to one of said bridges,
   and means differentially connecting said first and second capacitance bridges to thereby produce said output signal indicative of the net displacement of said mass.

5. An accelerometer comprising an enclosure,
   a nonferromagnetic electrically conducting mass,
   support means including a pair of coils arranged coaxially along an axis intersecting the center of said mass for maintaining said mass suspended within said enclosure,
   a source of alternating voltage connected to energize said coils and produce an alternating magnetic field constraining said mass to an equilibrium position within said enclosure,
   capacitor means including a pair of capacitance sensors connected to a pair of differentially connected capacitance bridges for sensing the net displacement of said mass from its equilibrium position and producing an output signal proportional thereto,
   and control means responsive to said output signal for varying the energization of said coils to produce a force acting on said mass in a direction opposite to the mass displacement.

6. Apparatus as in claim 5 in which the variation of the coil energization is proportional to the mass displacement.

7. Apparatus as in claim 5 in which the energization of said coils is varied to a series of constant discrete values as a function of mass displacement.

8. Apparatus as in claim 5 and including damping means for stabilizing the said mass about its equilibrium position.

9. Apparatus as in claim 8 in which said damping means includes means for differentiating said output signal to thereby produce a rate signal proportional to the rate of change of mass displacement,
and means for feeding said rate signal to said control means.

10. Apparatus as in claim 8 in which said damping means includes a viscous fluid surrounding said mass,
and a nonconducting wall within said enclosure and surrounding said mass for containing said fluid.

11. Apparatus as in claim 10 in which said capacitance sensors are positioned within said wall in contact with said fluid, said fluid conducting heat from said mass and said capacitance sensors to said walls whereby the heat is dissipated.

12. A three-axis accelerometer comprising a nonferromagnetic electrically conducting spherical mass,
first, second and third pairs of coils, each pair of coils arranged coaxially along orthogonal axes intersecting the center of said mass, one coil of each said pair being positioned on opposite sides of said mass,
a source of altenating voltage connected to energize said coils, each said pair of coils being energized by an alternating voltage having a frequency different from the voltage energizing the other said coil pairs,
said alternating voltage establishing a time varying magnetic field about each said coil 180° out of phase with the field established about the other coil of each coil pair whereby said mass is constrained to an equilibrium position within said enclosure,
and first, second and third pairs of capacitive sensing elements, each of said pairs being positioned within said enclosure adjacent said mass along an axis containing one of said coil pairs,
one of said elements from each pair being positioned on either side of said mass, each pair of elements sensing changes in the displacement of said mass from its equilibrium position along its respective axis and producing an output signal proportional thereto.

13. Apparatus as in claim 12 in which said source of alternating voltage provides current of a proper ratio to remove cross-axis coupling.

14. Apparatus as in claim 12 and including fluid means surrounding said mass,
and a nonconducting wall within said enclosure for containing said fluid.

15. A differential accelerometer comprising an enclosure,
a nonferromagnetic mass,
support means including a pair of coils arranged coaxially along an axis intersecting the center of said mass,
a source of alternating voltage connected to energize said coils and produce a magneic field constraining said mass to equilibrium within said enclosure at a reference position removed from the centerline between said coils by a distance proportional to the average steady acceleration to be measured, said coils being wound whereby the field produced by one coil is opposite to the field produced by the other coil,
and capacitor means positioned within said enclosure adajacent said mass and symmetrical about the reference position for sensing the displacement of said mass from its reference position along the axis containing said coils and producing an output signal proportional thereto.

16. Apparatus as in claim 15 and including fluid means having a density slightly less than the density of the mass surrounding said mass,
and means for containing said fluid.

References Cited

UNITED STATES PATENTS 3,261,210    7/1966    Buchhold.
3,307,884    3/1967    Dunlap et al. _____ 308—10

JAMES J. GILL, Primary Examiner

U.S. Cl. X.R.

308—10